United States Patent Office 3,051,654
Patented Aug. 28, 1962

3,051,654
PREPARATION OF METAL SALTS OF PHOSPHORUS SULFIDE-HYDROCARBON REACTION PRODUCTS
Eli W. Blaha, Highland, and Albert R. Sabol, Munster, Ind., assignors to Standard Oil Company, Chicago, Ill., a corporation of Indiana
No Drawing. Filed Dec. 23, 1959, Ser. No. 861,434
18 Claims. (Cl. 252—32.7)

The present invention relates to improvements in the preparation of neutralized reaction products of a phosphorus sulfide and a hydrocarbon and, more particularly, is directed to improvements in neutralizing the reaction products of a phosphorus sulfide and a hydrocarbon with a basic alkaline earth metal compound.

Neutralized reaction products of a phosphorus sulfide and a hydrocarbon, particularly olefin polymers, are extensively used as detergent-type lubricant additives in the preparation of improved lubricants for internal combustion engines. The use of such materials in lubricant compositions is described in U.S. Patents 2,316,080 and 2,316,082, issued April 6, 1943, to Clarence M. Loane and James W. Gaynor. The specifications of these patents disclose a neutralization of phosphorus sulfide-olefin polymer reaction products and phosphorus sulfide-hydrocarbon reaction products by treatment with various metal or amine-containing neutralizing agents at about 100° F.–400° F. The detergent-type addition agents, when added to lubricating oils for use in internal combustion engines, impart to the lubricating oil the property of maintaining clean engines. The neutralized phosphorus-sulfide hydrocarbon reaction products have excellent detergency imparting properties. However, it has been found to be desirable to increase the metal content of such neutralized products to increase the amount of detergency imparted by a given amount of neutralized product in lubricating oils so that less neutralized product may be added to a lubricating oil for satisfactory detergency. Further, increased basicity of the neutralized product, resulting from increasing the basic metal content, further increases the ability of the neutralized product in neutralizing acidic compounds which are corrosive in nature. The increased detergency resulting from increased basic metal content, is particularly valuable in recent years as more fuels having high sulfur contents come into use, necessitating increased corrosion protection and as modern engines require cleaner operating conditions for greater efficiency. The neutralized products, as detergents, act to disperse particles of carbon resin and the like in the lubricating oil and increased metal content results in increased dispersion. However, increasing the metal content of the neutralized reaction products, particularly where alkaline earth metal neutralizing agents are reacted with the phosphorus sulfide-hydrocarbon reaction products, requires the use of large amounts of neutralization agent. Further, where basic calcium compounds are used as neutralization agents it is difficult and often impossible to obtain very high metal to phosphorus ratios. Also, particularly where basic barium compounds are used, undesirable gels form in the product detracting from brightness of product and making the product difficult to filter. Therefore, it is important to increase the effectiveness of the alkaline earth metal content at lower levels of metal content in the relatively high metal-content neutralized phosphorus sulfide-hydrocarbon reaction products while still overcoming the problems relating to obtaining high metal-content, filterability and brightness.

It is an object of the present invention to provide an additive for lubricating oils having improved detergency properties with relation to metal content. It is another object to increase the effectiveness of an oil-soluble alkaline earth-metal neutralized reaction product of phosphorus sulfide and a hydrocarbon as a detergency addition agent for use in normally liquid lubricating oils. It is a further object to provide a method of neutralizing reaction products of a phosphorus sulfide and a hydrocarbon with an alkaline earth metal compound whereby a product having highly effective detergency metal content is obtained. A more specific object is to provide such a product which has a relatively high alkaline earth metal content. Another more specific object is to provide such a product of high metal content which product is readily filterable. Other objects and advantages of the present invention will become apparent from the following description thereof.

In accordance with the present invention, the foregoing objects can be attained by reacting a hydrolyzed reaction product of a phosphorus sulfide and a hydrocarbon, particularly an olefin polymer, with from about 0.5 to about 3 mols or more and preferably from about 1 to about 2 mols of a basic alkaline earth metal compound per mol of phosphorus present in the phosphorus sulfide-hydrocarbon reaction product in the presence of a compound selected from aldehydes and ketones and in the presence or absence of water. From about 0.25 to about 10 mols and preferably from about 0.5 to about 2.0 mols of aldehyde or ketone are used in the neutralization reaction mixture per mol of the alkaline earth metal compound. Up to about 10 mols of water per mol of the alkaline earth metal compound may also be used in the neutralization reaction mixture. Advantageously initial reaction temperature of the neutralization mixture is maintained at a temperature above about 150° F. but no higher than 400° F., more advantageously less than 250° F. and preferably at or below the reflux temperature of the aldehyde, ketone, or mixture thereof with water (where water is used in the reaction mixture). During the initial reaction, the aldehyde or ketone reacts with the reaction mixture and the neutralization of the phosphorus sulfide-hydrocarbon reaction product with basic alkaline earth compound is completed. The initial reaction may take from 10 minutes to 20 hours for completion depending on conditions selected, size of the reaction mixture, and the like. After completion of the initial reaction, the temperature of the reaction mixture is maintained above the boiling point of the aldehyde or ketone in the range of 150° F. to 400° F., preferably 250° F. to 400° F., to drive unreacted or excess aldehyde or ketone (and water where used) from the reaction product. Small amounts of unreacted or excess aldehyde or ketone may be permitted to remain in the product without adversely affecting the product. The product may be filtered at a temperature above about 300° F. to remove any inorganic compounds or other contaminants.

The products are oil-soluble and are useful as detergency and corrosion inhibition addition agents in normally liquid lubricating oils in amounts of from about .001 to about 25% by weight.

The neutralization reaction may be carried out by any order of addition of reactants except that the basic alkaline earth compound should not be permitted to react substantially with the hydrolyzed phosphorus sulfide-hydrocarbon reaction product before addition of the aldehyde or ketone to the reaction mixture. For example, all reactants can be added together and heated to the initial reaction temperature or the aldehyde or ketone may be mixed with the hydrolyzed phosphorus sulfide hydrocarbon reaction temperature before addition of the basic alkaline earth compound.

In another alternative procedure, only part of the basic alkaline earth metal compound is added in the initial reaction mixture and the remainder is added after the initial reaction is complete, i.e. when the reaction mixture is subjected to conditions sufficient to drive off excess aldehyde or ketone. This procedure is particularly useful where difficulties are encountered in obtaining satisfactory alkaline earth metal content in the neutralized product. For example, it is very difficult to form products containing reacted calcium to phosphorus ratios greater than 0.75:1, no matter how much calcium is used in the reaction mixture. With neutralization the presence of the aldehyde or ketone, the calcium to phosphorus ratio may be raised to about 1:1. By adding additional basic calcium compound after the initial reaction, this ratio may be raised above about 1:1. The step of adding additional basic alkaline earth metal compound after the initial reaction will hereinafter be known as "rebasing." The rebasing step may be carried out using the same or a different basic alkaline earth compound as used in the initial reaction. Although up to about 3 mols or more of the basic alkaline earth metal compound may be added per mol of phosphorus in the reaction mixture during the rebasing step, it is preferred to add less than about one mol in order to minimize removal of unreacted basic alkaline earth metal compound, e.g. by filtration after the excess aldehyde or ketone is removed.

The reflux temperature of the aldehyde or ketone in admixture with the other reactants is a convenient temperature at which to carry out the initial reaction. Such reflux temperatures are easy to maintain. For example, the reaction vessel may be fitted with a reflux condenser to maintain reflux temperature. If the reflux temperature falls outside the initial reaction temperature range, of course, other provisions for maintaining the temperature may be made.

In the preparation of the phosphorus sulfide-hydrocarbon reaction product, the hydrocarbon is reacted with a phosphorus sulfide, such as $P_2S_3$, $P_4S_3$, $P_3S_7$, or other phosphorus sulfides, and preferably phosphorus pentasulfide, $P_2S_5$.

The hydrocarbon constituent of this reaction is described in detail in U.S. 2,316,088 issued to Loane et al. on April 6, 1943. Briefly, the hydrocarbon constituent is preferably a mono-olefin hydrocarbon polymer resulting from the polymerization of low molecular weight monoolefinic hydrocarbons or iso-mono-olefinic hydrocarbons, such as propylenes, butylenes and amylenes, or the copolymers obtained by the polymerization of hydrocarbon mixtures containing iso-mono-olefins and mono-olefins of less than 6 carbon atoms. The polymers may be obtained by the polymerization of these olefins or mixtures of olefins in the presence of a catalyst such as sulfuric acid, phosphoric acid, boron fluoride, aluminum chloride or other similar halide catalysts of the Friedel-Crafts type.

A suitable polymer for the reaction with phosphorus sulfide is the product obtained by polymerizing in the liquid phase a hydrocarbon mixture containing butylenes and isobutylenes together with butanes and some $C_3$ and $C_5$ hydrocarbons at a temperature between about 0° F. and 30° F. in the presence of aluminum chloride. A suitable method for carrying out the polymerization is to introduce the aluminum chloride into the reactor and introduce the hydrocarbon mixture cooled to a temperature of about 0° F. into the bottom of the reactor and pass it upwardly through the catalyst layer while regulating the temperature within the reactor so that the polymer product leaving the top of the reactor is at a temperature of about 30° F. After separating the polymer from the catalyst sludge and unreacted hydrocarbons, the polymer is fractionated to obtain a fraction of the desired viscosity, such as, for example, from about 80 seconds to about 2000 seconds Saybolt Universal at 210° F.

Essentially paraffinic hydrocarbons such as bright stock residiums, lubricating oil distillates, petrolatums, or paraffin waxes, may be used. There can also be employed condensation products of any of the foregoing hydrocarbons, usually through first halogenating the hydrocarbons, with aromatic hydrocarbons in the presence of anhydrous inorganic halides, such as aluminum chloride, zinc chloride, boron fluoride, and the like.

Other preferred olefins suitable for the preparation of the herein described phosphorus sulfide reaction products are olefins having at least 20 carbon atoms in the molecule of which from about 13 carbon atoms to about 18 carbon atoms, and preferably at least 15 carbon atoms are in a long chain. Such olefins can be obtained by the dehydrogenation of paraffins, such as by the cracking of paraffin waxes or by the dehalogenation of alkyl halides, preferably long chain alkyl halides, particularly halogenated paraffin waxes.

Also contemplated within the scope of the present invention are the reaction products of a phosphorus sulfide with an aromatic hydrocarbon, such as, for example, benzene, naphthalene, toluene, xylene, diphenyl and the like or with an alkylated aromatic hydrocarbon, such as, for example, benzene having an alkyl substituent having at least four carbon atoms, and preferably at least eight carbon atoms, such as long chain paraffin wax.

In general, the preparation of the phosphorus sulfide-hydrocarbon reaction product in accordance with the present invention is carried out in the following manner:

The hydrocarbon such as, for example, an olefinic polymer of the desired molecular weight, is reacted with from about 1% to about 50%, and preferably from about 5% to about 25%, of a phosphorus sulfide, e.g., $P_2S_5$, at a temperature of from about 200° F. to about 600° F. in a nonoxidizing atmosphere, such as for example, an atmosphere of nitrogen. The reaction is carried out for from about one to about ten hours or more, and preferably for about five hours. The phosphorus sulfide-hydrocarbon reaction can, if desired, be carried out in the presence of a sulfurizing agent as described in U.S. 2,316,087, issued to J. W. Gaynor and C. M. Loane April 6, 1943. The reaction product obtained is then hydrolyzed at a temperature of from about 200° F. to about 500° F., and preferably at a temperature of 300° F. to 400° F., by a suitable means, such as for example, by introducing steam through the reaction mass. The hydrolyzed product containing inorganic phosphorus acids formed during the hydrolysis may then be contacted with an adsorbent material such as Attapulgus clay, fuller's earth and the like at a temperature of from about 100° F. to about 500° F., as more fully described and claimed in U.S. 2,688,612, issued to Roger W. Watson, and the treated, hydrolyzed product filtered to obtain a filtrate substantially free of inorganic phosphorus acids and low molecular weight organic phosphorus compounds. Although such a clay treating step has been found to be preferable when the prior art methods of neutralizing the phosphorus sulfide-hydrocarbon reaction product are employed, we have found that it is not necessary when using the neutralization process of this invention. Yields of from about 10 to 20% or higher are obtained when using our proces as compared to the prior art methods wherein the clay treating step is employed.

The hydrolyzed reaction product of phosphorus sulfide and a hydrocarbon, preferably treated in the above manner with or without clay treating, is then diluted with a normally liquid hydrocarbon, generally the same as or similar to the hydrocarbon oil in which the finished additive is to be employed, to a phosphorus content of from about 0.5% to about 5% or more. The neutralization step is carried out with a suitable basic alkaline earth metal compound such as a hydroxide, carbonate, oxide or sulfide of an alkaline earth metal such as, for example, barium oxide, barium sulfide, strontium oxide, calcium oxide, calcium hydroxide, calcium carbonate, or the like. Basic compounds of barium and calcium are preferred and barium oxide and calcium oxide are particularly preferred.

The basic alkaline earth metal compound may be admixed directly with the hydrolyzed phosphorus sulfide-hydrocarbon reaction product; it is preferable, however, to form a slurry of the basic metal compound in water or other readily removable carrier or a normally liquid hydrocarbon of a type comparable to the lubricating oil in which the additive is to be used. The total amount of the basic metal compound present in the slurry should be from about 0.5 to about 3 moles or more per mole of phosphorus present in the hydrolyzed phosphorus sulfide-hydrocarbon reaction product which is to be neutralized therewith.

The hydrolyzed phosphorus sulfide hydrocarbon reaction product may be contacted with an absorbent clay, or otherwise treated before the neutralization step, to remove inorganic phosphorus compounds and low molecular weight organic phosphorus compounds. Both the phosphorus sulfide-hydrocarbon reaction product and the basic metal compound are preferably diluted with a normally liquid hydrocarbon before admixing and carrying out the neutralization step.

The aldehydes or ketones which may be used are selected from the class of aldehydes and ketones boiling below about 450° F. and having less than 10 carbon atoms. The aldehydes and ketones may be alkyl, alkenyl, cycloalkyl, aryl, etc., aldehydes or ketones or mixtures thereof. The preferred aldehydes and ketones are the aldehydes and methyl ketones boiling below about 300° F. Examples of aldehydes and ketones which may be used in this invention are: formaldehyde, acetaldehyde, acrolein, propionaldehyde, crotonaldehyde, butyraldehyde, tigladehyde, enanthaldehyde, valeraldehyde, benzaldehyde, caprylaldehyde, acetone, ethyl methyl ketone, methyl vinyl ketone, mesityl oxide, diethyl ketone, diisopropyl ketone, cyclohexanone, cyclopentanone, and the like, and mixtures thereof. Commercial grades of aldehydes and ketones may be used. The presence of water in such commercial grade aldehydes or ketones even in substantial amounts does not adversely affect the reaction. For example, aqueous formaldehyde having a formaldehyde content of about 30 to 45% may be used. Formaldehyde is particularly preferred because of its availability and low cost.

Where the aldehyde or ketone contains substantial amounts of water, e.g. where commercial grade aldehydes or ketones containing water are used, then it is preferred to maintain the initial reaction temperature below about 212° F. so that water is not initially driven therefrom in any substantial amounts which may cause boiling over of the reaction mixture and result in loss of product. The reflux temperature of a reaction mixture containing water is a convenient temperature at which to carry out the reaction and there is no advantage gained in driving off the water during the initial reaction. However, the water is driven off after the initial reaction when the aldehyde or ketone is driven off. Small amounts of water may be allowed to remain in the product without adversely affecting its properties.

Where the aldehyde or ketone boils below the initial reaction temperature, pressure may be maintained to permit raising the neutralization reaction mixture to an initial temperature within the initial reaction temperature range. The pressure may be released while driving off the excess or unreacted aldehyde or ketone.

The following is a preparation of a hydrolyzed phosphorus sulfide-hydrocarbon reaction product, which reaction product is used as a starting material and reactant in the examples given below: a butene polymer having an average molecular weight in the range of about 750 to 800 was reacted with about 15.5 wt. percent $P_2S_5$ at a temperature of about 450° F. for a period of about 5½ hours. The resulting product was hydrolyzed with steam at a temperature of about 340° F. until the acidity of the product remained substantially constant with continued steaming.

The following examples are illustrative of our new and useful process for preparing our new and useful products:

EXAMPLE I

A hydrolyzed phosphorus pentasulfide-butene polymer reaction product, prepared as above, was diluted with SAE-5 mineral lubricating oil to a phosphorus content of about 0.5 mole per 1000 grams. 2000 grams of the diluted product were mixed with 112 grams of calcium oxide and 80 grams (.5 mol per mol of calcium oxide) of 37% aqueous formaldehyde. The mixture was heated at about 210° F. under total reflux conditions for 3 hours. The temperature of the mixture was then raised to 300° F. to drive off water and any unreacted formaldehyde. The product was filtered through Celite at 300° F. The resulting product was light in color, of bright appearance and was free of obnoxious odors. The product contained 1.4% phosphorus by weight and had a molar ratio of calcium:phosphorus of about 0.9:1.

The above example was successfully carried out sealed up to pilot plant capacity in a 5 gallon kettle.

EXAMPLE II

In order to demonstrate the rebasing step, a hydrolyzed phosphorus pentasulfide-butene polymer reaction product, prepared as above, was diluted with SAE-5 mineral lubricating oil to a phosphorus content of about 0.56 mol per 1000 grams. 2500 grams of the diluted product was mixed with 157 grams of calcium oxide and 210 ml. (1 mol per mol of calcium oxide) of 37% aqueous formaldehyde. The mixture was heated at 210° F. for 3 hours. The temperature of the mixture was then raised at 230° F. and a slurry of 20 grams of calcium oxide in 50 ml. of water was slowly added. The temperature was then raised to 300° F. while driving off water and any unreacted formaldehyde and the product was filtered through Celite. The product contained 1.65% phosphorus and had a calcium:phosphorus molar ratio of about 1.05:1.

EXAMPLE III

The procedure of Example I was repeated using about two mols of barium oxide per mol of phosphorous of the hydrolyzed reaction product in lieu of the calcium oxide. The product had a barium:phosphorus molar ratio of 1:1.

EXAMPLE IV

The procedure of Example I was repeated using 6 mols of 37% aqueous formaldehyde per mol of calcium oxide. The resulting product had calcium:phosphorus molar ratio of 1.20:1.

EXAMPLES V THROUGH VIII

Additional preparations of compositions of this invention were carried out to demonstrate other aldehydes or ketones in the process. Accordingly, the procedure of Example I was used while substituting the aldehyde or ketone and one mol of water per mol of CaO indicated below for the aqueous formaldehyde. The final temperature necessary to drive off a substantial amount of any unreacted aldehyde or ketone was also varied as indicated below. The resulting products had the respective calcium-phosphorus molar ratios indicated below:

| Example | Aldehyde or Ketone used | Approximate Final Temperature, °F. | Molar Ratio, Ca:P in Product |
|---|---|---|---|
| V | Acetaldehyde | 300 | 1.05:1 |
| VI | Acetone | 300 | 1.28:1 |
| VII | Propionaldehyde | 300 | 1.14:1 |
| VIII | Benzaldehyde | 450 | 0.90:1 |

In each example herein, only unreacted aldehyde or ketone was driven from the product. Reacted aldehyde or ketone remained in the product and even some unreacted aldehyde or ketone remained due to difficulty in removing all of it. However, the amount of unreacted aldehyde or ketone remaining did not materially adversely affect the product.

In order to demonstrate the increased effectiveness of the compositions of this invention as detergency agents, samples as described below were subjected to the L–1 Test, having C.R.C. Designation L–1–545, fully described in C.R.C. Handbook, 1956 edition, of the Coordinating Research Council, New York. The L–1 test is designed to measure engine lubricating oil detergency. Briefly, the test is conducted in a 1A–S1 single cylinder Caterpillar engine operating at 1000 r.p.m. at a load of 19.8 B.H.P., an oil sump temperature of 145–150° F. and a water temperature of 175–180° F. The test is run for 480 hours using a 1% sulfur S1 diesel fuel. At the end of each 120, 240 and 480 hours, inspections are made for filling of carbon in the ring grooves. Results are reported in Table I, expressed in terms of "pass" or "fail." Appearance of carbon in the second ring groove is considered a failing result in all cases. More than 25% carbon filling in the first ring groove is also considered failing.

Samples tested by the L-1 procedure were compounded by adding each of Additives A, B, C and D to a solvent extracted SAE–30 mineral lubricating oil. Additives A, B, C and D are fully described below. The results are reported for the minimum concentration of each additive at which passing results were obtained after the complete 480 hours of testing. The lubricating oil also contained a zinc dialkyl dithiophosphate in varying amounts; the weight percent of corrosion inhibitor present in each minimum passing concentration for each additive is also shown in the table.

Additives A, B, C and D are identified as follows:

*Additive A.*—A calcium oxide neutralized hydrolyzed $P_2S_5$-butene polymer reaction product prepared by neutralizing in the presence of formaldehyde in accordance with the procedure and amounts of Example II having a Ca:P molar ratio of 1:1.

*Additive B.*—A calcium oxide neutralized hydrolyzed $P_2S_5$-butene polymer reaction product prepared by the procedure of Example I except that 5 mols of methanol per mol of calcium oxide was used in place of the formaldehyde and the initial neutralization reaction was conducted at 156–160° F. instead of about 210° F. having a Ca:P molar ratio of 0.75:1.

*Additive C.*—The barium oxide neutralized hydrolyzed $P_2S_5$-butene polymer reaction product prepared in Example III (in the presence of formaldehyde) having a Ba:P molar ratio of 1:1.

*Additive D.*—A barium oxide neutralized hydrolyzed $P_2S_5$-butene polymer reaction product prepared by the procedure of Example III except that 5 mols of methanol per mol of barium oxide were used in place of the formaldehyde and the initial neutralization reaction temperature was 156–160° F. instead of about 210° F. having a Ba:P molar ratio of 1.23:1.

Table

| Additive | Ratio Metal to Phosphorus | | Neutralized in the Presence of— | | Corrosion Inhibitor, Wt. Percent | Min. Conc., Wt. percent for L–1 Pass, 480 Hrs. |
|---|---|---|---|---|---|---|
| | Ba:P | Ca:P | MeOH | HCHO | | |
| A | | 1:1 | | Yes | (1) 1.7 | 4.5 or less.[2] |
| B | | 0.75:1 | Yes | | (3) 0.75 | More than 5.5.[4] |
| C | 1:1 | | | Yes | (3) 0.75 | 4.4 or less.(2) |
| D | 1.23:1 | | Yes | | (3) 0.75 | 5.0. |

[1] Zinc dialkyl dithiophosphate in which the alkyl groups are derived from isopropyl and $C_{10}$ alcohols.
[2] The lowest concentrations tested passed and are reported.
[3] Zinc dialkyl dithiphosphate in which the alkyl groups are derived from $C_{6-8}$ alcohol.
[4] Failed at 5.5 wt. percent due to carbon in the 2nd ring groove Only concentration tested.

The results reported in the table above illustrate the improved detergency of the compositions of this invention in comparison with a methanol promoted neutralized phosphorus sulfide-hydrocarbon reaction product. The product of this invention passed the L–1 test at a lower total metal content than did the methanol promoted compositions.

To further illustrate our invention, the filterability and clarity of the products of the above examples was noted. In the filtering operation conducted in each example prepared, it was noted that all products filtered at a fast rate, about the same rate of filtration as do the methanol promoted products. The clarity of product was in all cases excellent and all products were light in color. Further, in all examples, the products were more pleasing in odor characteristics then were the methanol promoted products.

The herein described additive compositions of the present invention can be used as indicated above in varying amounts of from .001 up to about 25% in lubricating oils. Although the present invention has been illustrated by the use of the additive compositions in mineral lubricating oils, it is not restricted thereto. Other lubricating oil bases can be used, such as hydrocarbon oils, both natural and synthetic for example, those obtained by the polymerization of olefins, as well as synthetic lubricating oils of the alkylene oxide type and the polycarboxylic acid ester type, such as the oil soluble esters of adipic acid, sebacic acid, azelaic acid, etc. It is also contemplated that various other well known additives, such as antioxidants, anti-foaming agents, pourpoint depressors, extreme pressure agents, viscosity index improvers, and the like, may be incorporated in lubricating oils containing the additives of our invention.

Concentrates of a suitable oil base containing more than 10 percent, for example up to 70 percent or more, of the additives of this invention alone or in combination with other additives can be used for blending with hydrocarbon oils or other oils in the proportions desired for the particular conditions of use to give a finished lubricating product containing the additives of this invention.

Unless otherwise stated, the percentages given herein and in the claims are percentages by weight.

While we have described our invention by reference to specific embodiments thereof, the same are given by way of illustration only. Modifications and variations will be apparent from our description to those skilled in the art.

We claim:

1. In a process for reacting a basic alkaline earth metal compound and a hydrolyzed phosphorus sulfide-hydrocarbon reaction product prepared by reacting a hydrocarbon with from about 1% to about 50% of a phosphorus sulfide at a temperature in the range of from about 200° F. to about 600° F., the improvement which comprises reacting said hydrolyzed phosphorus sulfide-hydrocarbon reaction product with at least about 0.5 mol of a basic alkaline earth compound per mol of phosphorus present in said hydrolyzed phosphorus sulfide-hydrocarbon reaction product at a temperature in the range of from about 150° F. to about 400° F. in the presence of from about 0.25 to 10 moles (per mole of basic alkaline earth compound) of an organic compound selected from the class consisting of aldehydes and ketones having less than 10 carbon atoms and boiling below about 450° F.

2. The process of claim 1 wherein said basic alkaline earth metal compound is barium oxide.

3. The process of claim 1 wherein said basic alkaline earth metal compound is calcium oxide.

4. The process of claim 1 wherein said reacting is in the presence of less than 10 mols of water per mol of said basic alkaline earth compound.

5. The process of claim 1 wherein said phosphorus-sulfide-hydrocarbon reaction product is the reaction product of $P_2S_5$ and a butene polymer having a molecular weight in the range of from about 500 to about 50,000.

6. The process of claim 1 wherein said ketone is a methyl alkyl ketone having less than 10 carbon atoms.

7. The process of claim 1 wherein said organic compound is formaldehyde.

8. The process of claim 1 wherein said phosphorus sulfide-hydrocarbon reaction product is contacted with an adsorbent clay at a temperature of from about 100° F. to about 500° F. before said reacting with the basic alkaline earth metal compound.

9. A process for the preparation of an oil-soluble alkaline earth metal-containing neutralized hydrolyzed phosphorus sulfide-hydrocarbon reaction product, which process comprises reacting a hydrocarbon with from about 1% to about 50% of a phosphorus sulfide at a temperature in the range of from about 200° F. to about 600° F., hydrolyzing the resultant product at a temperature in the range of from about 200° F. to about 500° F., neutralizing the hydrolyzed phosphorus sulfide-hydrocarbon product with from about 0.5 to about 3 mols of a basic alkaline earth compound per mol of phosphorus in said hydrolyzed phosphorus sulfide-hydrocarbon reaction product at a temperature in the range of from about 150° F. to about 400° F. in the presence of from about 0.25 to about 10 mols per mol of said alkaline earth compound of an organic compound selected from the class consisting of aldehydes and ketones having less than 10 carbon atoms and boiling below about 450° F., and separating unreacted said organic compound from the resultant product.

10. The process of claim 9 which includes following said neutralizing the additional step of adding to said neutralized product an additional amount less than 3 mols of said basic alkaline earth compound per mol of said phosphorus.

11. The process of claim 10 wherein said basic alkaline earth compound is calcium oxide.

12. A process for preparing an oil-soluble calcium-containing neutralized hydrolyzed phosphorus pentasulfide-butene polymer reaction product, which process comprises reacting a butene polymer with from about 1% to about 50% of phosphorus pentasulfide at a temperature in the range of from about 200°F. to about 600°F., hydrolyzing the resultant product at a temperature in the range of from about 200°F. to about 500°F., neutralizing the hydrolyzed phosphorus pentasulfide-butene polymer reaction product with from about 1 to about 2 mols of calcium oxide per mol of phosphorus in said hydrolyzed phosphorus pentasulfide-butene polymer reaction product at a temperature in the range of from about 150°F. about 300°F. in the presence of from about 0.5 to about 2.0 mols of formaldehyde and 0 to 10 mols of water per mol of calcium oxide, and separating unreacted formaldehyde and water from the resultant product by heating the resultant product to a temperature in the range of from about 250°F. to about 450°F.

13. As a composition of matter, the oil-soluble neutralized reaction product prepared by the process of claim 9.

14. A lubricant composition comprising a major proportion of a normally liquid hydrocarbon oil and from about .001 to about 25% of the composition of claim 13.

15. An addition agent concentrate for lubricating oil comprising essentially a lubricating oil containing more than about 10% of the composition of claim 13, said concentrate being capable of dilution with a normally liquid lubricating oil to a concentration of said composition in the range of from about .001 to about 25%.

16. As a composition of matter, the oil-soluble neutralized reaction product prepared by the process of claim 10.

17. A lubricant composition comprising a major proportion of a normally liquid lubricating oil and from about .001 to about 25% of the composition of claim 16.

18. An addition agent concentrate for lubricating oils comprising essentially a lubricating oil containing more than about 10% of the composition of claim 6, said concentrate being capable of dilution with a normally liquid lubricating oil to a concentration of said composition in the range of from about .001 to about 25%.

References Cited in the file of this patent

UNITED STATES PATENTS

| | | |
|---|---|---|
| 2,726,208 | Karll et al. | Dec. 6, 1955 |
| 2,806,022 | Sabol | Sept. 10, 1957 |

OTHER REFERENCES

Whitmore: "Organic Chemistry," Second ed. May 1951, pub. by D. Van Nostrand Co., Inc., page 187.